ly Patent Office 2,877,235
Patented Mar. 10, 1959

2,877,235

ALPHA-LIPOIC ACID PROCESS

Carl S. Hornberger, Jr., Wilmington, Del., assignor to E. I. du Pont de Nemours and Company, Wilmington, Del., a corporation of Delaware No Drawing. Application May 28, 1954
Serial No. 433,281

1 Claim. (Cl. 260—327)

This invention relates to a process for preparing alpha-lipoic acid, which is a cyclic disulfide of the formula (1) 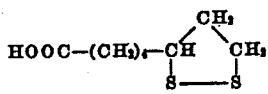

$$HOOC-(CH_2)_4-CH\diagup CH_2$$
$$\phantom{HOOC-(CH_2)_4-}S\!\!-\!\!\!-\!\!\!-\!\!S$$

Alpha-lipoic acid is a vitamin-like natural substance which is necessary for metabolism of living cells. It has recently been implicated in photosynthesis. It has found use as an antioxidant in fats, in hair waving formulations, as an agent for complexing heavy metals in treating heavy metal poisoning, and as a food supplement to improve the diet of animals.

The isolation of lipoic acid from natural sources is not commercially practical because of the small amount to be found in nature and because of difficulties in isolation. Several routes for its synthesis by chemical means have been developed which make use of an oxidative ring closure using a dimercapto-octanoic acid as an intermediate. This oxidative ring closure is accompanied by polymer formation. When an oxidant other than iodine is used, there is a danger of forming higher oxidized products. A disadvantage to the use of iodine is its cost.

I have now found that a compound of Formula 1 can be prepared without an external oxidant and with a minimum of polymer formation by the alkaline treatment of a dithiocyano derivative of a fatty acid ester having the formula (2) $$ROOC-(CH_2)_4-CH-CH_2-CH_2-SCN$$
$$\phantom{ROOC-(CH_2)_4-CH}SCN$$

where R is a lower alkyl group containing from 1 to 6 carbon atoms.

This alkaline reaction which leads to ring closure is conducted in a relatively concentrated solution and without regard to a balanced stoichiometry with reference to the ring closing agent.

The dithiocyanate derivative of a fatty acid ester represented by Formula 2, which is reacted with alkali to form, after acidification, lipoic acid or a homolog, can be prepared from hydroxy or halogen-substituted fatty acid esters, or esters containing both hydroxy and halogen groups, by a sequence of reactions with salts of thiocyano acid or treatment with an organo sulfonyl halide followed by treatment with a salt of thiocyanic acid. This sequence of reactions is graphically shown below.

ROUTE A

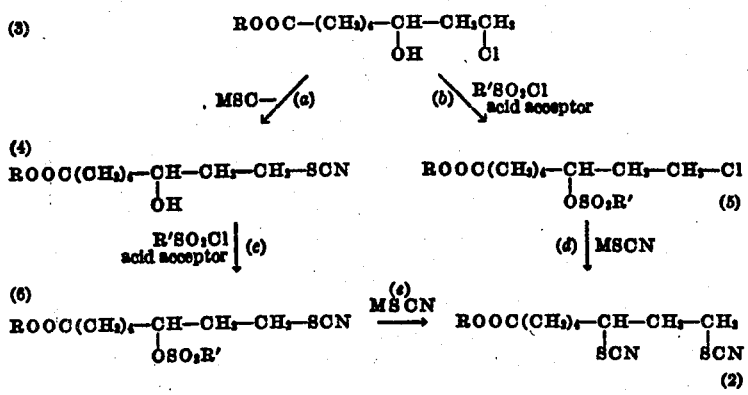

ROUTE B

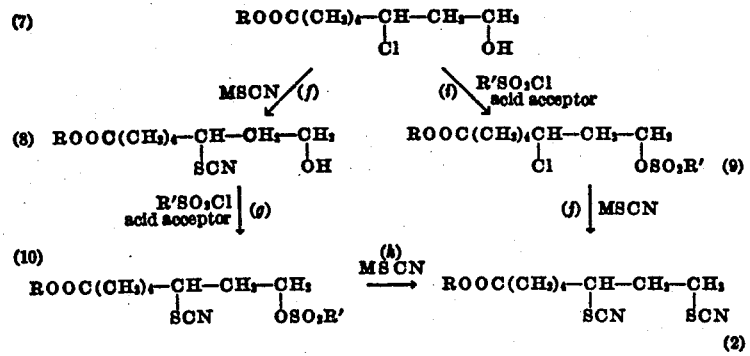

In Routes A and B, R has the same significance as in Formula 2, R' is alkyl, aryl or alkaryl, and M represents alkali metal or ammonium.

ROUTE C

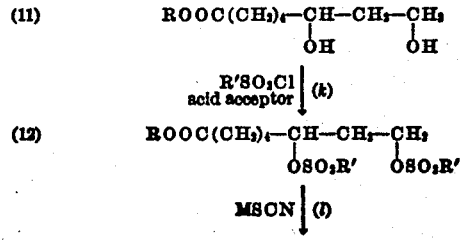

(2)

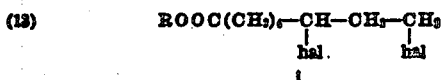

R, R' and M have the same significance as in Route A.

ROUTE D

(13)

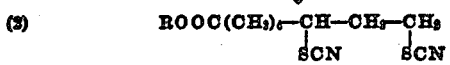

(2)

R and M have the same significance as in Routes A, B and C, and hal represents a halogen of the class consisting of chloro, bromo and iodine.

Illustrative of the compounds which may be used as starting materials in Routes A, B, C or D, there may be mentioned the following:

Methyl 8-chloro-6-hydroxyoctanoate
Methyl 8-bromo-6-hydroxyoctanoate
Ethyl 8-chloro-6-hydroxyoctanoate
Propyl 8-chloro-6-hydroxyoctanoate
t-Butyl 8-chloro-6-hydroxyoctanoate
n-Butyl 8-chloro-6-hydroxyoctanoate
Sec-butyl 8-chloro-6-hydroxyoctanoate
Iso-amyl 8-chloro-6-hydroxyoctanoate
n-Amyl 8-chloro-6-hydroxyoctanoate
Hexyl 8-chloro-6-hydroxyoctanoate
Methyl 6,8-dibromooctanoate
Ethyl 6,8-dichlorooctanoate
Methyl 6,8-dihydroxyoctanoate
Ethyl 6,8-dihydroxyoctanoate
Methyl 6-chloro-8-hydroxyoctanoate
t-Butyl 6-chloro-8-hydroxyoctanoate
Ethyl 6-bromo-8-chlorooctanoate
Ethyl 8-bromo-6-chlorooctanoate
Ethyl 6-chloro-8-iodooctanoate
Ethyl 6,8-diiodooctanoate Compounds of Formula 3, and of Formula 13 where halogen is chlorine, are fully described in U. S. Patent 2,792,406. In brief, these compounds can be prepared from the Friedel-Crafts addition of an olefin to an acid chloride derived from a half acid ester.

Broadly speaking, compounds of Formulae 3, 7, 11 and 13, that is, the starting materials for Routes A, B, C and D, can be prepared in accordance with the synthesis outlined hereafter, wherein X is a halogen having an atomic number above 9.

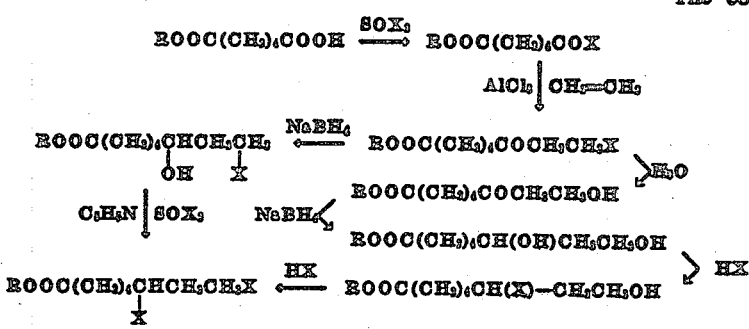

Referring to Routes A and B, it will be noted that in step "b" or "i," the hydroxychloro compound is mixed with an organo sulfonyl chloride, preferably in a solvent. An acid acceptor, such as for instance, a tertiary amine or a weak organic base, may be added to remove the by-product mineral acid. An excess amine may be used as a solvent or an inert diluent may be used.

The intermediate halosulfonic ester of Formulae 5 and 9 can be isolated or treated in the same solvent with a salt of thiocyanic acid to produce the desired dithiocyano derivative of a fatty acid ester of Formula 2.

An alternative route comprising steps "a," "c," and "e" is to treat the hydroxychloro compound of Formula 3 with a salt of thiocyanic acid to produce a hydroxy thiocyano compound of Formula 4. This hydroxy thiocyano compound can then be treated in a solvent with an organo sulfonyl halide in the presence of an acid acceptor. The solvent may be inert or a tertiary amine. The resultant thiocyanosulfonic ester of Formula 6 can then be treated with a salt of thiocyanic acid to give the dithiocyano derivative of a fatty acid ester of Formula 2.

Another method of preparing a compound of Formula 2 is illustrated by steps "k" and "l" starting with a dihydroxy compound for Formula 11. A double quantity of the organo sulfonyl halide is employed with a weak base to yield a double sulfonic acid of Formula 12, followed by treatment with a salt of thiocyanic acid.

The conversion of the dihalo compound of Formula 13 to the dithiocyano compound involves treatment with a salt of thiocyanic acid.

Among the preferred organo sulfonyl halides are methane sulfonyl chloride and toluene sulfonyl chloride. Other sulfonyl halides may, however, be used but they are generally more expensive. Methane sulfonyl chloride is particularly preferred because of its low molecular weight.

Any of a variety of compounds may be used as the acid acceptor including tertiary amines or weakly basic inorganic salts such as, for instance, sodium carbonate, sodium bicarbonate or calcium carbonate. Pyridine and triethylamine are preferred acid acceptors because they also function as solvents. If desired, the tertiary amine may be diluted with an organic solvent such as benzene or ether to minimize cost.

The preferred salts of thiocyanic acid which are employed in the processes of this invention are potassium or sodium thiocyanate. Ammonium thiocyanate or other metal thiocyanates such as, for instance, calcium, may be used but the rate of reaction is slower when they are used in contrast to when alkali metal thiocyanates are employed.

Although the replacement of the organo sulfonyl or halo group with the metal thiocyanate can be conducted at a high temperature at which the salt is molten, it is preferred to conduct the reaction at more moderate temperatures in the presence of an inert solvent such as, for instance, benzene. In order to increase the solubility of the thiocyanate salt dimethyl formamide may be used to form a more soluble complex with the salt.

The conversion of dithiocyanates of Formula 2 to alpha-lipoic acid or a homolog thereof alkaline treatment is effected in solution. A convenient reaction medium is an alcohol such as, for instance, ethanol. Anhydrous alcohol is not essential. In fact, in some instances, better yields are obtained when some water is present. In order that the reaction may be completed in a reasonable time a strong alkali such as sodium or potassium hydroxide is preferably used. For this same reason, the temperature preferred is about the boiling point of the solvent. The use of a strong base also brings about a cleavage of the ester group so that the free acid may be isolated after acidification. An oxygen-free atmosphere is preferred. This reduces the oxidation of lipoic acid which may take place under alkaline conditions. As regards the isolation of the resulting lipoic acid, or homolog thereof, convenient practices used in the isolation of a fatty acid may be followed.

Considering in more detail the formation of the organosulfonyl ester, it should be pointed out that a preferred method is to add the sulfonyl halide to a solution comprising a hydroxy compound of Formula 3, 4, 7, 8, or 11 and a tertiary amine. The hydroxy compound may be added to a mixture of sulfonyl halide and tertiary amine. The addition of the tertiary amine to a mixture of the hydroxyl compound and sulfonyl halide is less desirable. When a sulfonyl halide and the hydroxyl compound are mixed, a difficultly controlled spontaneous reaction may occur. This leads to by-products.

Ordinarily, the hydroxyl compound and the sulfonyl halide are employed in about equimolar amounts. The tertiary amine is used in from 10 to 30% excess in the event an inert solvent is used. Otherwise, the amine is used in larger amounts sufficient to dissolve all reactants. The hydroxyl compounds, sulfonyl halide and tertiary amine should be as free from water as possible because the sulfonyl halide is destroyed in amounts corresponding to the amount of water present. For this reason, an atmosphere of dry nitrogen is often used to prevent reaction with atmospheric moisture.

The temperature range for satisfactory reaction of the sulfonyl halide with the hydroxy substituted compound is in the range of from −5 to 20° C. Some decrease in yield is noted at temperatures above 20° C. Above 40°, the yield drops substantially. Below −5° C. the reaction proceeds slowly.

The sulfonyl halide-hydroxy compound reaction as judged by the precipitation of the by-product amine salt proceeds to near completion within two hours. No decrease has been observed when the reaction time has been increased to about 18 hours.

Inasmuch as the reaction between the sulfonyl halide and the hydroxy substituted fatty acid ester proceeds with the formation of a precipitated salt, stirring is preferable to prevent unchanged reactants from being occluded to the precipitate. Stirring helps to maintain a homogeneous state in the liquid phase.

As regards the isolation of the organosulfonyl ester of Formulae 5, 6, 9, 10, 12 the reaction mixture is filtered after the reaction is completed to remove the precipitated salt. Alternatively, the by-product salt can be removed by washing with cold water. Evaporation in vacuo of the solvent at a pressure less than 40 mm. mercury and a temperature of less than 50° C. is practised to obtain the sulfonyl ester as a crude oil. However, the sulfonyl ester can be used in solution without the necessity of evaporation if the salt is removed. When an amine is used as an acceptor, the by-product amine salt can be removed by decomposition with sodium bicarbonate.

The replacement of the organo halide by a thiocyanate salt in the processes of my invention involves mixing the substituted organic ester with a thiocyanate salt, preferably in the presence of a solvent, bringing the reactants to reaction temperature. Without the presence of a solvent the replacement of the halogen by the isocyanate group requires a temperature in the range of from 170 to 200° C. This temperature is necessary to melt the alkali thiocyanate. However, in the presence of an ameliorating solvent such as dimethylformamide, a temperature of from 80 to 160° C. is practical. At lower temperatures the reaction takes a longer time and at higher temperatures the product may be discolored.

Generally speaking, about equimolar amounts of the substituted organic ester and thiocyanate salt are used. A slight improvement in yield is often realized in the presence of an excess of thiocyanate salt.

The replacement of the negative organohalide group by a thiocyanate may be conducted in the fused state. It is preferred, however, to use an inert solvent in which the inorganic as well as the organic components are soluble. Dimethylformamide is a preferred solvent because of the ease with which it dissolves the inorganic salt. However, other solvents such as, for instance, alcohols, ketones and esters, may be used. The presence of traces of water seems to have no effect upon the reaction.

The reactants, that is, the organohalide and metal thiocyanate, must be brought in good contact with each other in order for the reaction to be complete. Intimate mixing is essential.

Since isolation of the sulfonyl ester in a pure state is not essential for the purposes of my invention the ester may merely be washed with water to free it from the by-product salt. No further purification is required.

The replacement of the sulfonyl ester by thiocyanate salt is effected by mixing and heating the reactants until a reaction ensues. Ordinarily, the sulfonyl ester and the thiocyanate salt are used in about equimolar amounts. A slight increase in yield is sometimes obtained when about a 5% excess of the thiocyanate salt is utilized.

Since sulfonyl esters are sensitive to water in the presence of heat, the reactants should be as anhydrous as possible. However, rigorously anhydrous conditions are not critical.

Although the replacement of the sulfonyl ester may be accomplished in fused thiocyanate salt, it is preferred to bring about the reaction at a lower temperature in the presence of a solvent, preferably an inert organic solvent such as benzene. A preferred solvent is dimethyl formamide which forms a more soluble complex.

When the replacement of the sulfonyl esters of Formulae 5, 6, 9, 10 and 12 by thiocyanate salt is conducted in solvent any temperature between the freezing point of the solution and the boiling point may be used. In order to reduce the reaction time the preferred temperature is from about 80 to 120° C. When the reactants are heated in a solvent at 80 to 120° C., the time of the reaction is short. About one hour is sufficient to insure completion of reaction.

When the reaction, that is, step $d$, $e$, $h$, $j$, $l$, or $m$, is conducted in benzene and dimethyl formamide, a formation of a gel is frequently observed. Vigorous stirring is therefore required to insure an intimate mixing of the reactants. Because a compound of Formula 2 may be used in an impure state, in the processes of the present invention, a water wash is sufficient to remove the by-product salt.

In carrying out ring closure step of the processes of my invention, the dithiocyanate organo-ester is mixed with an alkaline solution and the mixture maintained at a temperature of from 0 to 150° C. To decrease reaction time the mixture is preferably kept at a temperature near that of reflux, that is, 50 to 100° C. Temperatures about 100° C. are not preferred since pressure is then required. The ring closure is effected in about 4 hours or less.

The dithiocyanate can be added to the alkali solution or the alkali can be added to a solution of the dithiocyanate. One mol of the dithiocyanate organo ester requires a minimum of three molar parts of alkali. An excess up to as much as ten parts of alkali may be used to speed the reaction to completion. The presence of water is desirable because under completely anhydrous conditions the formation of a cyclic disulfide is complicated by the formation of other products.

It is preferred to use a solvent in which both the thiocyanate compound and alkali are soluble. Such solvents include alcohol and alcohol-water mixtures. Water alone may be used and the dithiocyanate goes into solution as the reaction proceeds. Preferably, the dithiocyano compound in alcohol is added as a single batch to an alcohol-water solution of alkali. The alcoholic solution is stirred mainly to assist in even heat transfer and to promote even boiling.

After completion of the ring closure, the alkaline solution is made acid with a mineral acid such as, for instance, hydrochloric acid or sulfuric acid. At this point, by-product inorganic salt usually separates and can be removed by filtration. The filtrate containing lipoic acid is reduced in volume by evaporation in vacuo. The majority of the alcohol present is thus removed from the system. The resulting mixture comprising product salts and water is extracted with a solvent to dissolve and remove lipoic acid or an analog thereof. Any of a wide variety of solvents may be used including benzene, toluene, ether and the like. The lipoic acid, thereof, is recovered from the solvent by distillation. It is recrystallized from a solvent such as for instance petroleum ether, hexane or cyclohexane. When water alone is used as a solvent, only acidification and extraction are used to obtain crude lipoic acid.

The intermediate hydroxy chloro compounds of Formulae 3 and 7 are known to be herbicides while the intermediate hydroxy thiocyano and dithiocyano compounds of Formulae 2, 4 and 8 are insecticides and are active against such pests as weevils, aphids, and mites. The compounds of Formulae 2, 4, and 8 are also active as herbicides.

In order to better understand the invention, reference should be had to the following illustrative examples:

*Example 1*

PREPARATION OF dl-ALPHA-LIPOIC ACID

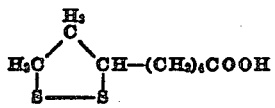

Two hundred and seventy-two parts by weight of monomethyl adipate, 3500 parts of dry tetrachloroethane and 236 parts of thionyl chloride are heated slowly until reflux temperature is reached. This requires about 45 minutes. The mixture is heated at reflux temperature for an additional half-hour. Hydrogen chloride and sulfur dioxide are evolved during the reflux period. A still head is placed on the flask in place of a condenser and 100 parts of distillate are collected. The acid chloride in the flask is then cooled to 15–20°.

To the cooled reaction mixture 453 parts of anhydrous aluminum chloride are added over a period of twenty minutes. Thru a tube leading to below the surface of the solvent, there is passed a rapid stream of ethylene for a period of two hours while the temperature of the reaction mixture is maintained at $25\pm5°$ C.

At the end of this period, the reaction mixture is poured into a rapidly stirred mixture of 2,000 parts of finely crushed ice and 250 parts of concentrated hydrochloric acid. The mixture is stirred for a period of ten minutes. The lower phase is separated from the water and washed with two portions of water and two portions of 5% sodium bicarbonate solution. The time required for the decomposition and washing is about one hour.

The solution thus obtained and consisting essentially of methyl 8-chloro-6-ketooctanoate, whose formula is

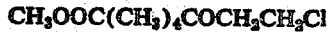

is placed in a vessel cooled by an ice bath. When the temperature of the solution has reached 10° C., a solution of 18 parts of sodium borohydride in 500 parts of alcohol is added over a fifteen minute period. The reaction mixture is stirred at a temperature of 10° C. for a period of 45 minutes. It is then heated to a temperature of 50° C. for a period of one-half hour to decompose the excess sodium borohydride. The mixture is cooled to 20–25° C. and made acid with concentrated hydrochloric acid to a pH of 1.0–2.0. The acidified mixture is washed with three portions of water, each portion consisting of 100 parts, and one portion of dilute sodium bicarbonate solution. The product, methyl 8-chloro-6-hydroxyoctanoate, is isolated by distillation following the evaporation of the solvent in vacuo. The boiling point of methyl 8-chloro-6-hydroxyoctanoate is 131–135° C. at 0.1–0.2 mm. mercury. The index of refraction using sodium "D" light is 1.4620–1.4660 at 25° C.

A mixture consisting of 104 parts of methyl 8-chloro-6-hydroxyoctanoate prepared as described above, 48 parts of potassium thiocyanate and 200 parts of dry dimethyl formamide (dried by distillation) is stirred and heated. When the temperature of the mixture reaches about 100° C., the salt goes into solution. At the temperature of 140–150° C. a precipitate begins to form.

The precipitated salt can be removed by filtration. The majority of the solvent is removed in vacuo at 20 mm. Hg and up to 100° C. The crude oil is taken up in 200 parts of tetrachloroethane and washed with five 200 ml. portions of water. The addition of ferric chloride to a filtered portion of the wash water produces only a slight red color. The solvent is removed in vacuo. The index of refraction of methyl 6-hydroxy-8-thiocyanooctanoate is $n_D^{25}$ 1.4940±0.0040.

The methane sulfonic ester of methyl 6-hydroxy-8-thiocyanooctanoate is prepared by placing 58 parts of methyl 6-hydroxy-8-thiocyanooctanoate, 30 parts of dry pyridine and 100 parts of dry benzene in a vessel cooled to 15° C., and adding to the vessel 29 parts of methane sulfonyl chloride over a period of 15 minutes. The temperature of the reaction mixture is allowed to rise to 25° C. The mixture is stirred for a period of two hours. During this period the solution becomes filled with fine crystals of pyridine hydrochloride, which are removed by filtration. This filtration is effected with care being taken to exclude moisture.

To a mixture comprising 300 parts of dry dimethyl formamide and 48 parts of potassium thiocyanate and heated to a temperature of about 150° C., there is added the methyl 6-hydroxy-8-thiocyanooctanoate methane sulfonic acid, from the previous step, at such a rate that the temperature of the reaction mixture does not drop below 130° C. During this addition, benzene is distilled out of the mixture.

After the addition is completed, the heating is continued for an additional ten minutes. The reaction mixture is then cooled to about 110° C. and 500 parts of dry tetrachloroethane is added. After the mixture is cooled to 15–20° C. it is filtered with the aid of "Celite." The filtrate is washed with from two to five portions of water, that is, until the ferric chloride test for thiocyanate is negative. Occasionally it may be necessary to clarify the two phase suspension of the first wash by passing through "Celite" wetted with tetrachloroethane. The solvent is removed in vacuo.

The resulting dark oil consisting essentially of methyl 6,8-dithiocyanooctanoate is dissolved in 1500 parts of denatured alcohol. To the resulting solution there is added a mixture of 55 parts of potassium hydroxide. The mixture is heated under reflux for a period of from 1 to 2 hours. The mixture is then cooled to 20° C. and made acid with concentrated hydrochloric acid to pH 1.0–2.0. The salts which precipitate can be removed by filtration. The solvent is removed in vacuo. The residue is extracted with benzene. The water layer is again extracted with a small portion of benzene. The combined benzene extracts are dried over sodium sulfate and evaporated in vacuo. The crude lipoic acid weighing 30 parts is purified by distillation in high vacuum using a simple short path still heated by an oil bath at a temperature of 200–230° C. The crude material boils at 185–195° C. at 0.5 mm. mercury. Upon cooling and seeding the crude lipoic acid, crystallization occurs, M. P. 54–56° C. The distilled lipoic acid can be further purified by dissolving in a minimum of cyclohexane at 50° C. and pouring into 5 volumes (based upon the volume of cyclohexane) of low boiling petroleum ether. The purified dl-lipoic acid crystallizes in the cold after seeding to give material melting at 58 to 59° C.

Analysis.—Calcd. for $C_8H_{14}O_2S_2$: C, 46.57; H, 6.84; S, 31.08. Found: C, 47.61, 47.30; H, 7.07, 6.94; S, 29.92.

*Example 2*

Nine hundred parts by weight of monoethyl adipate is dissolved in 6382 parts by weight of tetrachloroethane. To this mixture there is added 700 parts of thionyl chloride. The mixture is stirred and heated slowly so that at the end of one hour reflux temperature is reached. The mixture is maintained at reflux for a period of one-half hour. 200 parts by weight of tetrachloroethane is removed by distillation.

This reaction mixture consisting essentially of carbethoxyvaleric acid chloride is cooled by means of a ice bath to a temperature of 7° C.

To the cooled acid chloride there is added quickly 1350 parts of anhydrous aluminum chloride. An excess of ethylene is then passed into the solution for a period of three hours at a rate of about ½ part per minute. The temperature of the reaction vessel is maintained in the range of 20 to 25° C. At the end of this period, the reaction mixture is poured into 6000 parts of ice and 850 parts of concentrated hydrochloric acid. The resulting mixture is stirred for a period of ten minutes and then the aqueous layer is removed by means of a siphon. The solvent layer is washed with three 3000 part portions of cold water and two portions of 5% sodium bicarbonate solution. The washed organic solution consists essentially of the ethyl ester of 8-chloro-6-ketooctanoic acid.

The ethyl ester is cooled to a temperature of about 8° C. A slurry of 54 parts of sodium borohydride in 1500 parts of ethanol is added to the ester over a period of about one hour. During this addition the temperature of the mixture is maintained in the range of 5–15° C. After the mixture is stirred for a period of two hours at a temperature of 15–25° C., 100 parts of concentrated hydrochloric acid is added. The resulting mixture is filtered to remove the solid by-product salts and then washed with water and dilute sodium bicarbonate. After removal of the solvent in vacuo, the product, ethyl 8-chloro-6-hydroxyoctanoate is distilled. It boils at 160–175° C. at a pressure of 0.1 to 0.2 mm. mercury. Its index of refraction at 25° C. is 1.4590±0.0010.

A mixture consisting of 350 parts of potassium thiocyanate, 1500 parts of dimethyl formamide, and 678 parts of 8-chloro-6-hydroxyoctanoate acid ethyl ester obtained as above described is stirred and heated to a temperature of 120–130° C. for a period of one hour. During this treatment the formation of a precipitate is noted. The reaction mixture is cooled and poured in the water. An oily organic product is collected with the aid of 500 parts of benzene. The organic layer is washed with successive portions of water until a portion of the wash water gives only a slight positive test for thiocyanate ion by the ferric chloride reagent. The benzene solution is then dried over anhydrous magnesium sulfate. While it is not essential for the preparation of lipoic acid, the product, ethyl 6-hydroxy-8-thiocyanooctanoate, can be isolated by removing the benzene in vacuo and distilling the product at 200–205° C. at 1 mm. mercury pressure. Its index of refraction at 25° C. is 1.4860±0.0010.

A dry reaction vessel which has provision for the exclusion of atmospheric moisture is charged with 1627 parts of a benzene solution containing about 660 parts of ethyl 6-hydroxy-8-thiocyanooctanoate and 280 parts of dry pyridine. The mixture is stirred and cooled to a temperature of 7° C. 342 parts of methane sulfonyl chloride is added to the cooled mixture over a ten minute period. The mixture is stirred in the cold for a period of three hours. It is allowed to stand for 14 hours. 383 parts of anhydrous sodium bicarbonate is added to the mixture cooled to 4° C. The bicarbonate addition required a 15 minute period. After the mixture is stirred for a period of one hour the suspended salts are removed by filtration. The solution, which contains methyl sulfonyl ester of ethyl-6-hydroxy-8-thiocyanooctanoate, is used in the next step.

To the solution described in the preceding paragraph there is added 300 parts of potassium thiocyanate and 600 parts of dry dimethyl formamide. The resulting mixture is stirred, heated and maintained at reflux for a two hour period. During the heating a gel forms. The reaction mixture is cooled to room temperature, washed with four portions of water and dried over magnesium sulfate. Evaporation of the solvent in vacuo gives a dark oil which has an index of refraction of about 1.5060. This oil consisting mainly of ethyl 6,8-dithiocyanooctanoate can be purified by dissolving it in an equal weight of benzene and passing the benzene solution over a column of decolorizing charcoal. The resulting material has an index of refraction of 1.5081.

Two hundred and thirty parts of the crude ethyl, 6,8-dithiocyanooctanoate is dissolved in 500 parts of alcohol. This alcoholic solution is added to a mixture comprising 358 parts of potassium hydroxide, 1000 parts of water and 2500 parts of alcohol. The resulting mixture is heated for a period of six hours at reflux temperature. It is then cooled to a temperature of 15° C. and made acid by the addition of concentrated hydrochloric acid. The precipitated salts are removed by filtration; the solvent is removed in vacuo using the heat of a steam bath.

The resulting mixture of oil, salts, and water is extracted with benzene. The benzene extract is washed with water once and then dried over anhydrous magnesium sulfate. The benzene is evaporated in vacuo to give the desired product, alpha-lipoic acid, in crude form. The crude product is distilled at 180–200° C. at 0.5 to 1.0 mm. of mercury, and crystallizes in the distillation receiver. Alpha-lipoic acid may be recrystallized from 15 to 20 times its weight of methyl cyclohexane to give compound melting at 58–60° C.

*Example 3*

To a cooled mixture comprising 80 parts of methyl 8-chloro-6-hydroxyoctanoate, prepared as in Example 1, and 100 parts of dry pyridine, there is added 50 parts of methane sulfonyl chloride at a temperature of 10° C. over a five minute period. After the mixture is stirred for one-half hour in the cold and an additional half-hour at room temperature, 100 parts of anhydrous ether is added to precipitate the by-product pyridine salt. This salt is removed by filtration.

After removal of the pyridine in vacuo the oily product is combined with 80 parts of potassium thiocyanate and heated to 200° C. for a period of 15 minutes. The reaction mixture is cooled and then treated with 100 parts of alcohol to break up the mass and subsequently with water to dissolve the salt and form an oily layer.

The oily layer is collected with 500 parts of tetrachloroethane. The tetrachloroethane solution is then washed with successive portions of water, dilute sodium bicarbonate solution, dilute hydrochloric acid and water. During the wash it is preferable to clarify the two phase system by filtration thru "Celite." The oil consisting mainly of crude methyl 6,8-dithiocyanooctanoate and solvent is dried over magnesium sulfate and solvent is removed in vacuo.

Fifty-six parts of crude methyl 6,8-dithiocyanooctanoate is dissolved in 600 parts of alcohol and the alcoholic solution is treated with 56 parts of potassium hydroxide dissolved in 100 parts of water at reflux temperature for a period of one and one-half hours. A major portion of the solvent is removed in vacuo to leave about 200 parts of crude reaction mixture. This mixture is diluted with an equal volume of water and washed with ethyl acetate. The aqueous solution is then acidified with concentrated hydrochloric acid and extracted twice with ethyl acetate. The ethyl acetate solution of alpha-lipoic acid is washed with water and dried over sodium sulfate. After removal of the solvent in vacuo, the dl-alpha lipoic acid is purified by distillation.

I claim:

A process for preparing a compound of the formula

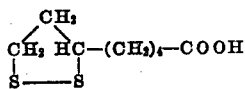

which comprises mixing in a hydroxylic solvent a dithiocyano compound of the formula

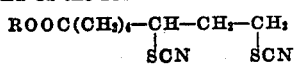

where R is lower alkyl with a base of the formula

where M is selected from the class consisting of an alkali metal and ammonium radicals, for each molar part of said dithiocyano compound at least 3 molar parts of base being available in the reaction system initially, and maintaining the temperature of the reaction mixture from 0 to 150° C. for a period of up to about 6 hours, whereupon ring closure is effected.

References Cited in the file of this patent

UNITED STATES PATENTS

| | | |
|---|---|---|
| 2,077,478 | Hollander et al. | Apr. 20, 1937 |
| 2,077,479 | Hollander et al. | Apr. 20, 1937 |
| 2,194,517 | Bousquet | Mar. 26, 1940 |
| 2,535,706 | Stevens et al. | Dec. 26, 1950 |
| 2,658,900 | Stevens et al. | Nov. 10, 1953 |

OTHER REFERENCES

Hagelberg: Berichte 23, 1083 and 1084 (1890) (Beilstein, vol. 19, 1 and 28 (1934)).

Kenyon: J. Chem. Soc., 1935, 1072–84 (C. A. 29:7272).

Suter: Org. Chem. of Sulfur (1944), pages 507 and 508.

UNITED STATES PATENT OFFICE
Certificate of Correction

Patent No. 2,877,235　　　　　　　　　　　　　　　　　　　　　　　　March 10, 1959

Carl S. Hornberger, Jr.

It is hereby certified that error appears in the printed specification of the above numbered patent requiring correction and that the said Letters Patent should read as corrected below.

Column 2, for the reactant of step (a) in Route A shown beneath Formula 3, reading $$\text{MSC}\!\!-\!\!\diagup\!\!(a) \quad \text{read} \quad \text{MSCN}\!\!\diagup\!\!(a)$$

column 4, line 16, for "compound for" read —compound of—; line 68, for "thereof alkaline" read —thereof by alkaline—.

Signed and sealed this 18th day of August 1959.

[SEAL]

Attest:
KARL H. AXLINE,
*Attesting Officer.*

ROBERT C. WATSON,
*Commissioner of Patents.*